Figure 1:
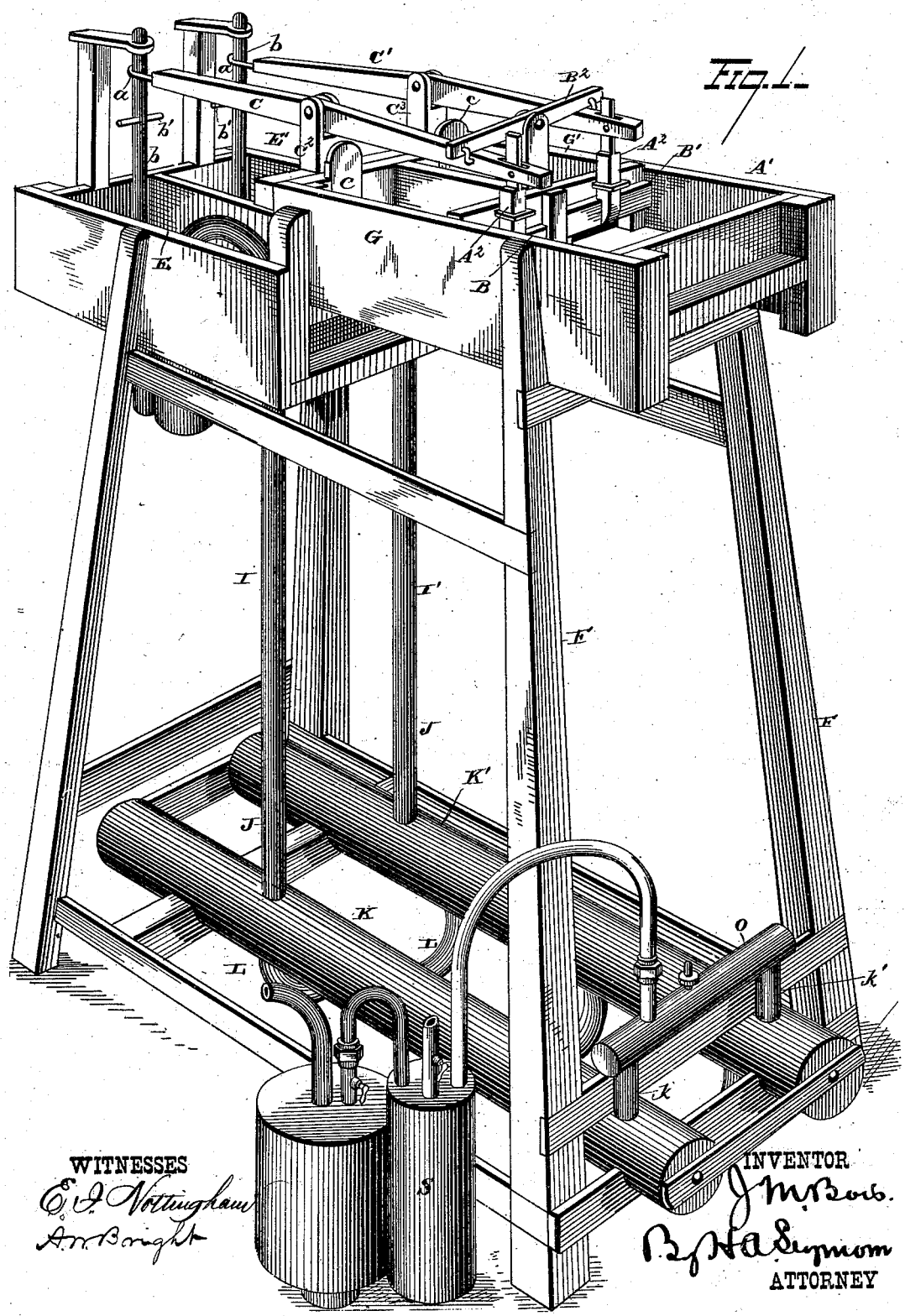

(No Model.) 3 Sheets—Sheet 1.

J. M. BOIS.
Hydraulic Air-Compressing Apparatus.

No. 227,877. Patented May 25, 1880.

WITNESSES
E. J. Nottingham
A. W. Bright

INVENTOR
J. M. Bois.
B. H. A. Seymour
ATTORNEY

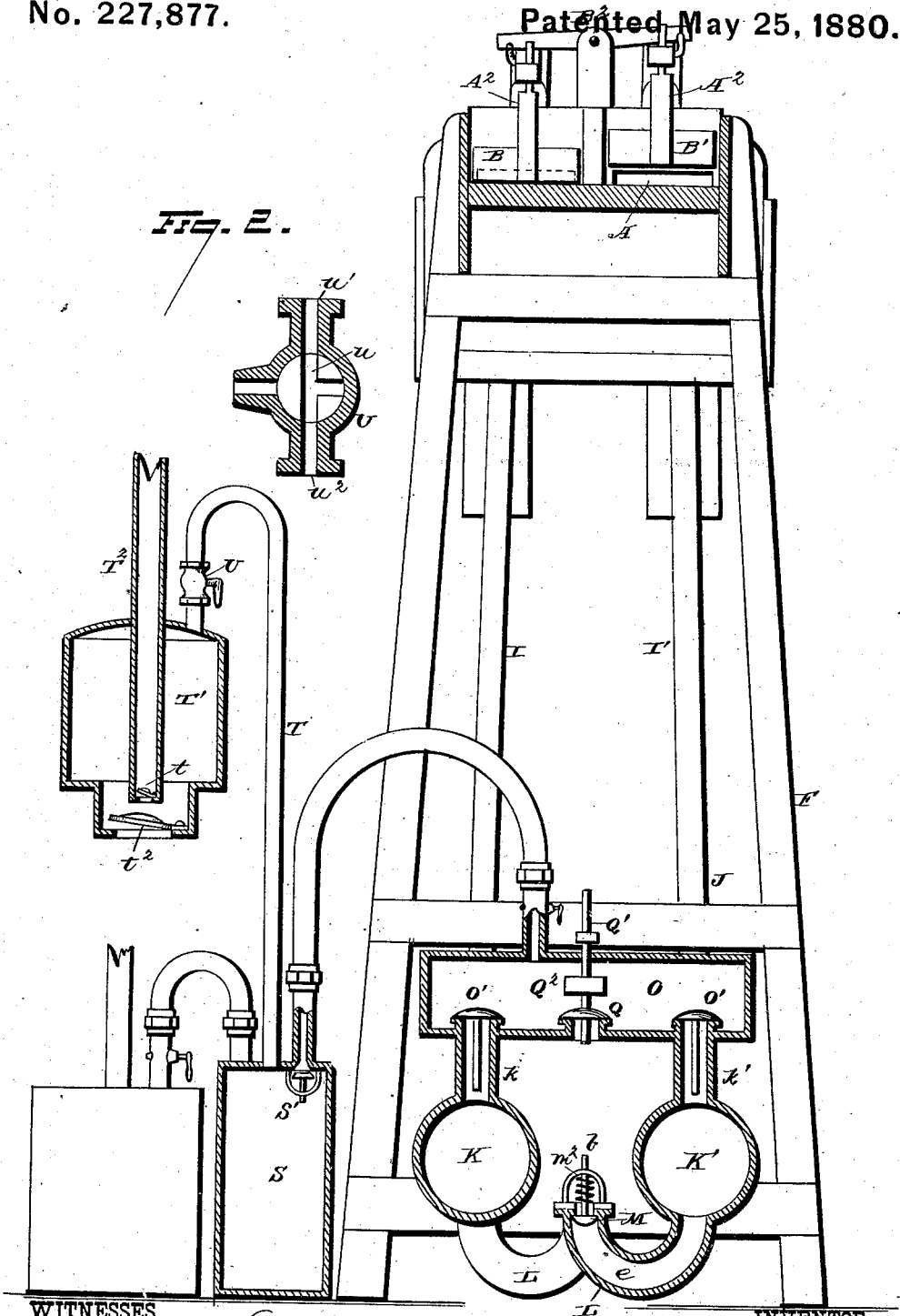

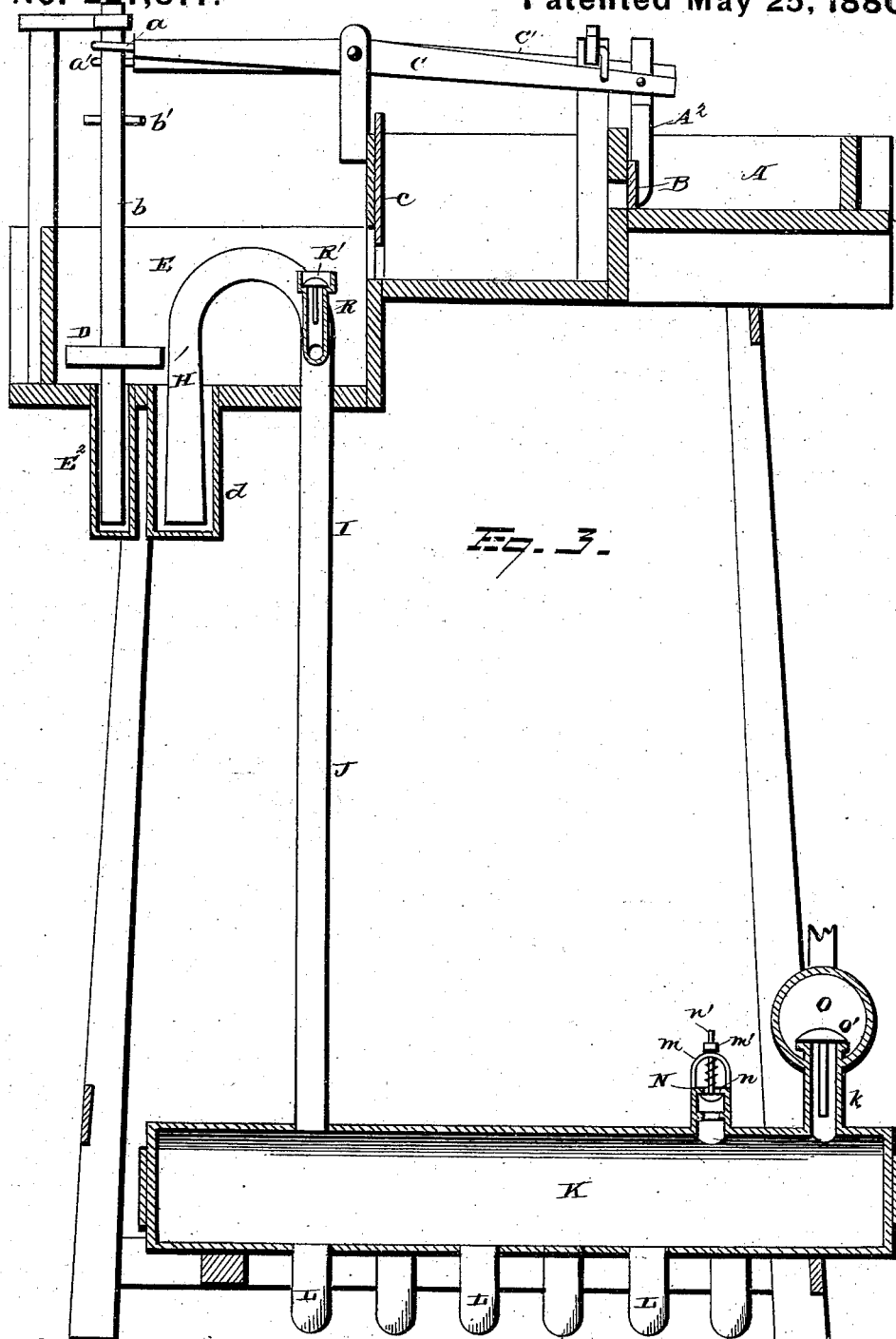

UNITED STATES PATENT OFFICE.

JAMES M. BOIS, OF AURORA, NEW YORK.

HYDRAULIC AIR-COMPRESSING APPARATUS.

SPECIFICATION forming part of Letters Patent No. 227,877, dated May 25, 1880.

Application filed March 13, 1880. (No model.)

*To all whom it may concern:*

Be it known that I, JAMES M. BOIS, of Aurora, in the county of Erie and State of New York, have invented certain new and useful Improvements in Hydraulic Air-Compressing Apparatus; and I do hereby declare the following to be a full, clear, and exact description of the invention, such as will enable others skilled in the art to which it pertains to make and use it, reference being had to the accompanying drawings, which form part of this specification.

My invention relates to an improvement in hydraulic air-compressing apparatus, the object being to utilize a head of water to compress air in a continuous and automatic manner and store it for use for motive power in actuating air-engines, for raising water, for use in carbureters, and all purposes where compressed air may be employed.

My invention consists in certain features of construction and combinations of parts, as will hereinafter be described, and pointed out in the claims.

In the accompanying drawings, Figure 1 is a view, in perspective, of my improved apparatus. Fig. 2 is a vertical section taken transversely through the combined air and water tanks or cylinders. Fig. 3 is a vertical section taken longitudinally through the combined air and water tanks.

A represents a reservoir, into which water is received from any source. A' is an overflow or waste pipe communicating with reservoir A to carry off any surplus water. Reservoir A is furnished with two gates, B B', which are connected by suitable rods $A^2 A^2$, with the opposite ends of an oscillating beam, $B^2$, so that as one gate is closed the other one will be opened. Water flows from the reservoir A into the two separate and independent flumes G G', the latter being located sufficiently below the reservoir A that they may be retained filled or partially filled with water after the gate communicating with the reservoir A has been closed. Each one of the flumes G G' is furnished with a gate, c, which is provided with an adjusting-rod, so that it may be retained in any desired adjustment to regulate the flow of water from the flume, the object being to adjust the gates c c, so that the flow of water from the flumes will be less than the flow of water from reservoir A into the flumes, and thereby cause the flumes to be filled with water after the gates B B' have been closed. Water flows from the flumes G G' into the separate and independent reservoirs E E', which are located below the flumes.

Reservoirs E E' are furnished with floats D, each float being secured to a spindle, b, having an arm or tappet, b', secured thereto. The lower ends of the spindles work in guide-tubes $E^2$, attached to the bottoms of reservoirs E E', thereby retaining the spindles in vertical position. To the upper ends of posts or standards $C^2 C^3$ are pivoted the levers C C', said levers being hinged or pivoted to the opposite ends of the oscillating beam $B^2$. The opposite ends of levers C C' are perforated, as at a a', for the passage of the float-spindles b. The reservoirs E E' are secured to the top of a frame, F, or other suitable structure. Each one of the reservoirs E E' is provided with a well or chamber, d, into which extends the lower end of the short leg H of the siphons I I', the long leg J of each siphon extending downwardly any desired distance and connecting at their lower ends with the combined air and water tanks K K'. Each one of the tanks K K' is provided with a series of water-discharge pipes, L, which communicate at one end with the lower portion of the tank or cylinder and extend downwardly and then upwardly, thereby forming a water-trap, e, while the upper and open end of the pipe is provided with an upwardly-closing check-valve, M, which may be of any desired form or construction. When disk or puppet valves are used a cage or yoke is attached to the open end of the discharge-pipe to form a suitable guide for the valve-stem b, the latter being encircled by a spring, $m^2$, for opening the valve. To the upper sides of each tank K K' is connected an air-supply valve, N, which closes upwardly against the valve-seat n. The stem n' of valve N is furnished with a spring, m, of light tension, and with an adjusting-nut or set-screw or other device, m', which is used to regulate the throw of the valve.

O represents a compressed-air tank, with which both tanks K K' communicate by the pipes k' $k^2$, the latter being supplied with downwardly-closing check-valves O' O'. Compressed-air tank O is also furnished with a downwardly-closing discharge-valve, Q, the stem Q' of which has a float, Q², attached thereto.

The stem extends upwardly, passing through the tank, and is adapted to be operated by hand. The long leg J of each one of the siphons has a branch pipe, R, connected therewith near its upper end. Pipes R are each provided with a downwardly-closing check-valve, R'.

A large air-tank, S, is connected with the compressed-air tank O by a pipe provided with a check-valve, S'.

Having described the construction and relative arrangement of the several parts of my improved hydraulic air-compressing apparatus, I will now proceed to describe its operation.

Water flows into the reservoir A from any convenient source of supply, keeping the reservoir filled, and should there be any surplus water it may be conveyed by the overflow-pipe to any desired point, either for operating another air-compressing apparatus or to be used for any other purpose desired. When the gate B is open the gate B' is closed, and hence the water flows from reservoir A into the flume G, which latter is located a sufficient distance below the level of reservoir A that it will be filled with water after the gate B shall have been closed.

Water is retained in the flume by reason of the fact that the gate c is adjusted to form a water-passage of less capacity than the passage from the reservoir to the flume. Water thus flows from the reservoir A through the flume G and enters the reservoir E, gradually filling the latter, and at the same time raising the float D. When the float D rises the tappet or arm secured to the spindle of float D comes in contact with and raises the outer end of lever C, thereby depressing its opposite end, which is hinged or pivoted to the oscillating beam B², and thus closes the gate B, and at the same time opens the gate B', thereby allowing water to flow from the reservoir A into the flume G', and from thence into the other reservoir, E'. Thus the two reservoirs E E' are alternately filled and the regulating-gates are automatically operated by the lifting power of the water acting on the floats D. Should either of the gates B or B' close before the water in either the reservoirs E E' had risen to a height sufficient to cover the top of the siphon, the surplus water in the flumes will flow into the reservoir, and thus raise the water to the required height to operate the siphons with certainty. As the water rises in the short leg of the siphon and fills the same the latter immediately commences to empty the reservoir E of water and transfer it through the long leg of the siphon to the combined air and water tank K. As the water enters the tank K under a pressure corresponding to its head or the height of the column of water in the long leg of the siphon, it rises in the discharge-pipes and closes all the discharge-valves, thereby preventing any escape of water, and also closes the air-supply valve or valves, thus compressing the air in the tank and raising the check-valve between the tank and compressed-air tank, and forcing the compressed air into the latter.

Thus it will be observed that air from both of the combined air and water tanks K K' is alternately forced into the compressed-air tank, from whence it is conveyed by pipes to the large tank S. The capacity of each of the tanks K K' is practically the same as that of each of the reservoirs E E', so that when either one of the tanks K K' has been filled the reservoir which connects therewith and the siphon-supply pipe will have been emptied of water, and thus allow the air thereby displaced which is not forced into the compressed-air tank to rise through the long leg of the siphon and escape through the valve in the branch pipe connecting with its upper end. The pressure in the tank K or K' having been materially lessened by reason of the escape of the confined air and absence of the column of water in the long leg of the siphon, the several discharge-valves are opened simultaneously and the contained water quickly discharged from the tank. As the tank is emptied of its water the air-supply valve opens, causing the tank to immediately refill with air.

I have described the operation of but one siphon; but the other operates in exactly the same manner, and hence a duplicate description is unnecessary, it being understood that while one of the reservoirs, E, is being emptied of water and compressed air is being forced into the compressed-air tank the other reservoir, E', is being filled with water preparatory to its operation when the water shall have escaped from reservoir E.

The compressed-air tank is provided with downwardly-closing valve having a float connected with its stem. This valve serves the following purpose: Should the gates refuse to operate properly, or should there be an undue supply of water to one of the combined air and water tanks for any reason, the water will rise and enter the compressed-air tank, lifting the float and opening the discharge-valve, thereby releasing the water and enabling the apparatus to regain its automatic operation.

From the foregoing it will be understood that I am enabled to retain a constant and unvarying supply of compressed air in the compressed-air tank, from which the air may be conveyed through one or more pipes to any desired point for utilization. The compressed air may be used for raising water for a supply for carbureters, for motive power to operate air-engines, or for any of the great number of uses to which compressed air is supplied.

When the compressed air is employed to raise water, a pipe, T, is connected at one end with the compressed-air receiver, and its other end with a water-chamber, T′, into which extends the lower end of a water-discharge pipe, T², the latter having a downwardly-closing check-valve, t, connected with its lower end, and the chamber T′ having a downwardly-closing check-valve, t², connecting with its lower end. In the air-pipe T is placed a two-way valve, U, which, being turned so that its through passage u registers with the opposite ends of the air-pipe u′ u², allows air to enter the upper portion of the chamber T′ and expel the water therefrom, driving it upwardly through the water-discharge pipe. After the water has been expelled from the chamber T′ the two-way valve is closed, so as to cut off the pressure from the air-receptacle and open a communication from the water-chamber T′ to the outer air, thereby allowing the air to escape from the water-chamber and the latter to refill with water, when the operation is repeated.

Having fully described my invention, what I claim as new, and desire to secure by Letters Patent, is—

1. The combination, with the siphon-reservoirs and main supply-reservoir, of separate and independent gates in the main supply-reservoir, separate and independent floats and float-spindles in the siphon-reservoirs, levers each having one of the main supply-reservoir gates connected therewith at one end and the float-spindle with its opposite end, and an oscillating beam having its opposite ends connected with said levers, whereby the gates are operated successively in an automatic manner to supply water to the siphon-reservoirs, substantially as set forth.

2. The combination, with the separate and independent siphon-reservoirs and flumes, of the main supply-reservoir, adjustable flume-gates, and automatically-actuated gates governing the supply of water to the flumes, substantially as set forth.

3. The combination, with two siphon-reservoirs and devices for automatically supplying water thereto, each one of said reservoirs having the short leg of a siphon inserted therein, of two combined air and water tanks, each furnished with a series of water-discharge valves, which are actuated solely by the decrease of pressure in the tank, and one or more air-supply valves of a compressed-air tank, into which air is alternately forced from the two combined air and water tanks, and check-valves to prevent the back flow of air, substantially as set forth.

4. The combination, with the siphons, siphon-reservoirs, combined air and water tanks, and compressed-air tank, of a valve provided with a float, said valve located in the compressed-air tank and serving to automatically discharge water from the tank, substantially as set forth.

5. The combination, with a reservoir, A, flumes G G′, adjustable gates c, and reservoirs E E′, of the gates B B′, oscillating beam B², levers C C′, floats D D′, and arms or tappets b′ b′, substantially as set forth.

In testimony that I claim the foregoing I have hereunto set my hand this 24th day of February, 1880.

JAMES M. BOIS.

Witnesses:
F. O. McCleary,
E. I. Nottingham.